United States Patent
Lambert et al.

(10) Patent No.: US 7,350,204 B2
(45) Date of Patent: Mar. 25, 2008

(54) POLICIES FOR SECURE SOFTWARE EXECUTION

(75) Inventors: John J. Lambert, Kirkland, WA (US); Praerit Garg, Kirkland, WA (US); Jeffrey A. Lawson, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 846 days.

(21) Appl. No.: 09/877,710

(22) Filed: Jun. 8, 2001

(65) Prior Publication Data

US 2002/0099952 A1   Jul. 25, 2002

Related U.S. Application Data

(60) Provisional application No. 60/220,269, filed on Jul. 24, 2000.

(51) Int. Cl.
  *G06F 9/45* (2006.01)
(52) U.S. Cl. .......................... 717/172; 726/21
(58) Field of Classification Search ............. 717/172; 713/153; 707/219; 726/21
  See application file for complete search history.

(56) References Cited

U.S. PATENT DOCUMENTS

| | | | | | |
|---|---|---|---|---|---|
| 4,713,753 | A | * | 12/1987 | Boebert et al. | 711/164 |
| 4,805,222 | A | * | 2/1989 | Young et al. | 382/115 |
| 4,926,476 | A | * | 5/1990 | Covey | 711/163 |
| 5,367,624 | A | * | 11/1994 | Cooper | 715/734 |
| 5,481,700 | A | * | 1/1996 | Thuraisingham | 707/9 |
| 5,819,091 | A | * | 10/1998 | Arendt et al. | 719/331 |
| 5,915,025 | A | * | 6/1999 | Taguchi et al. | 380/44 |
| 5,958,051 | A | * | 9/1999 | Renaud et al. | 726/22 |
| 5,978,484 | A | | 11/1999 | Apperson et al. | 705/54 |
| 5,983,349 | A | * | 11/1999 | Kodama et al. | 713/200 |
| 5,991,519 | A | * | 11/1999 | Benhammou et al. | 726/3 |
| 6,295,605 | B1 | * | 9/2001 | Dockter et al. | 713/166 |
| 6,378,069 | B1 | * | 4/2002 | Sandler et al. | 713/153 |
| 6,405,202 | B1 | * | 6/2002 | Britton et al. | 707/9 |
| 6,775,779 | B1 | * | 8/2004 | England et al. | 726/26 |
| 6,931,540 | B1 | * | 8/2005 | Edwards et al. | 713/188 |
| 6,981,281 | B1 | | 12/2005 | LaMacchia et al. | 726/27 |
| 7,028,180 | B1 | * | 4/2006 | Aull et al. | 713/156 |
| 7,051,366 | B1 | | 5/2006 | LaMacchia et al. | 726/14 |

(Continued)

OTHER PUBLICATIONS

U.S. Appl. No. 09/598,814, filed Jun. 21, 2000, Brain Lamacchia, "Applying a Permission Grant Set to a Call Stack During Runtime".

*Primary Examiner*—John Chavis
(74) *Attorney, Agent, or Firm*—Workman Nydegger

(57) ABSTRACT

A system and method that automatically, transparently and securely controls software execution by identifying and classifying software, and locating a rule and associated security level for executing executable software. The security level may disallow the software's execution, restrict the execution to some extent, or allow unrestricted execution. To restrict software, a restricted access token may be computed that reduces software's access to resources, and/or removes privileges, relative to a user's normal access token. The rules that control execution for a given machine or user may be maintained in a restriction policy, e.g., locally maintained and/or in a group policy object distributable over a network. Software may be identified/classified by a hash of its content, by a digital signature, by its file system or network path, and/or by its URL zone. For software having multiple classifications, a precedence mechanism is provided to establish the applicable rule/security level.

74 Claims, 10 Drawing Sheets

U.S. PATENT DOCUMENTS

| | | |
|---|---|---|
| 7,076,557 B1 | 7/2006 | LaMacchia et al. .......... 709/22 |
| 2001/0049793 A1* | 12/2001 | Sugimoto ................... 713/200 |
| 2003/0225698 A1* | 12/2003 | Stefik et al. ................. 705/51 |
| 2004/0068721 A1* | 4/2004 | O'Neil et al. ................ 717/168 |
| 2005/0203819 A1* | 9/2005 | Rogers et al. ................ 705/35 |
| 2006/0031686 A1* | 2/2006 | Atallah et al. ............... 713/190 |

* cited by examiner

POLICIES FOR SECURE SOFTWARE EXECUTION

CROSS-REFERENCE TO RELATED APPLICATION

The present invention claims priority to U.S. Provisional Patent Application Ser. No. 60/220,269, filed Jul. 24, 2000.

FIELD OF THE INVENTION

The present invention is generally directed to computer systems, and more particularly to an improved security framework for computer systems.

BACKGROUND OF THE INVENTION

Computer users, and particularly business users, typically rely on a set of programs that are known and trusted. For example, in enterprise computing environments, system administrators and helpdesk personnel are trained in supporting a core set of programs used in operating the business. However, in most enterprise environments, particularly in larger environments in which some flexibility is important with respect to what various employees need to do with computers to perform their jobs, users are able to run unknown and/or untrusted code, that is, programs outside of the supported set. As a result, administrators begin to lose control over what software code the enterprise's machines are executing. For example, some of these programs may conflict with other installed programs, change crucial configuration data, and so on.

Worse, some of the untrusted code may be malicious code (e.g., a computer virus possibly in the form of a Trojan horse) that intentionally misrepresents itself to trick users into running it, typically inflicting damage, corrupting data or otherwise causing mischief to the computers on which the malicious code runs. To prevent this, virus protection software is provided. Contemporary virus protection software typically comprises virus scanning engines that operate based on signature-based pattern matching, in which files are scanned for known viruses and design pattern matching strings to characteristically identify instances of that identical virus. One problem with this approach is that it is reactive rather than proactive, in that a virus first needs to be individually identified and characterized by virus detection experts, after which it can have its appropriate signature information distributed to various computers to allow the automated detection thereof. However, in addition to requiring skilled personnel to detect the virus, the virus typically keeps spreading during the time the experts need to perform the analysis, and also prior to the time that the information needed for detection can be distributed to protect uninfected computers.

The problem or running unknown code is compounded by recent developments in computing, wherein many types of content that formerly consisted of only passive data (e.g., documents and web pages) have potentially become executable code, due to the scripts and/or macros they may contain. As a result, the above problems and the like can also occur with content that does not intuitively lend itself to being thought of as executable, whereby even relatively sophisticated users may be less vigilant than would be the case when consciously running code that is unmistakably executable (such as an ".exe" file).

One method to reduce the possible damage that can be done when running unknown applications is for a user to log onto a computer with a user account that has less access rights and/or less privileges than the user would have to system or network resources if logged on with a different user account. This takes advantage of existing computer security system models that determine each user's access to network resources based on permissions granted according to that user's credentials, whereby any potential damage done by unknown executable code is limited or contained by the reduced access rights and/or privileges. However, this requires the user be diligent in logging on as appropriate for a given task, or otherwise have the foresight of knowing that a potentially unknown application is about to be executed, which is not always possible. Additionally, the effort required to log-on at various times with different credentials and to otherwise take advantage of this technique is tedious. For example, the extra effort needed to copy or re-install an application so that it can be suitably run by a user having a different user account is sufficiently laborious to discourage such actions from being common practice. Furthermore, this technique is ineffective if the application is a familiar application (considered trusted) and has been unknowingly infected or altered by a virus or a malicious program or user. For example, even a highly safety-conscious user may assume (incorrectly) that an application previously known to be trusted is still safe to run, when that may not be the case. In any event, even a user logged on with less than the user's maximum access rights may still do a lot of damage to resources that the less-privileged user can access.

In sum, in contemporary computer systems, running unknown code cannot be prevented, and indeed is necessary to an extent in many enterprises, yet doing so leads to increased support costs in system maintenance and helpdesk time, and decreased user productivity. At the same time, with the rise in the usage of networks, email and the Internet for business computing, users find themselves exposed to a wide variety of executable programs including content that is not identifiable as being executable in advance. As a result, users are frequently confronted with making decisions about running unknown code, and, given the sheer number and variety of programs, it is very difficult for individual users to consistently make effective choices about what software they should run.

SUMMARY OF THE INVENTION

Briefly, the present invention provides an improved computer security system and method wherein software that possibly includes executable code is identified and classified, and then a rule corresponding to the classification (or if none correspond, a default rule) automatically and transparently determines the software's ability to execute. A set of rules for a machine or user may be maintained in a restriction policy, e.g., in a group policy object distributable over a network, and a restriction policy can be applied per machine and/or per user of a machine. Depending on what the rule specifies for the classification that is determined for any given software module (e.g., software file), the software may execute in a normal (unrestricted) execution environment (context), in a restricted execution environment, or the software may be prevented from running at all. For example, the execution environment may correspond to running software with a user's normal security privileges and access rights, or some restricted subset of the user's normal privileges and access rights.

The present invention provides various ways to identify/classify software, along with a highly flexible policy-based infrastructure to enforce decisions about whether software can run, and if so, how much the software will be restricted when it runs. For example, the present invention provides a transparent way to run untrusted (and hence potentially harmful) code in a constrained environment in which such code is not allowed to perform certain operations, such as operations that deal with system data or user data.

Software can be identified and classified in one or more ways, including by a unique hash value of its content, whether it is digitally signed, and if so, by who, by its file system or network path, and/or by its origin or source, e.g., its URL (Uniform Resource Locator) zone. In this manner, an administrator or the like (hereinafter generally administrator, regardless of whether one or more administrators are present or whether a machine is a standalone machine having a single user) can group general types of content together by criteria chosen by the administrator for purposes of running it in a controlled security environment, yet further differentiate certain content, such as selected content known to be trusted or as having come from a trusted source, or selected content known to be dangerous. For example, software downloaded from an Internet zone may be generally treated as untrusted, but certain Internet content treated as normal (unrestricted) if it is digitally signed by a trusted entity. The present invention can also be extended to identify software for restricted execution in other ways, such as to allow a program associated with attachments (e.g., an e-mail program) to operate normally when accessing its own code, but to identify external files such that they will operate in a restricted environment, e.g., when requesting that an attachment be opened.

A software restriction policy comprising a set of rules is provided to correlate the classification information for any software to a security level that may restrict or prevent the software from running. A policy can be per machine and per user, and can be automatically applied to network users via group policy technology. A policy generally comprises a general (default) rule and exceptions to the default rule set by an administrator. In this manner, for example, an administrator can efficiently constrain (or prevent from running) everything on a machine, except for certain identified software files or software classifications that are allowed to run at some other security level, also set by the administrator. Alternatively, via the default rule an administrator can allow everything to run at one security level, such as with the user's normal rights, except for certain specified software or software classifications. For software that has multiple classifications, (e.g., it fits a specified pathname and also has an associated hash), and thus may have multiple, possibly conflicting rules, a precedence mechanism is described that establishes which rule, and thus which security level, applies. In general, the precedence mechanism favors more-specific content identification information over less-specific information.

In an enterprise environment, the policy may be set for sites, domains, organizational units, groups and/or users via group policy technology. Further, the invention may be extended to do things such as automatically generate and propagate rules, for example, by dynamically accessing a database to find new software that has been identified as having a virus, and dynamically generating and distributing new policy including a rule that prevents that software from running.

Typical security levels for execution (arbitrarily named herein) may include normal (unrestricted), constrained (restricted) or disallowed (revoked), although other levels such as end-user and untrusted are possible, and customized levels can be defined. The security level determines whether the software can run, and if so, the execution environment in which it will run. For example, in a restricted token security model, each level below normal (i.e., corresponding to running with the user's normal access token) corresponds to how restrictive a restricted access token is computed to be. In this implementation, the security level can be used to determine which privileges are removed from the restricted token relative to its parent token, which security identifiers are changed, as well as how their rights are changed, (e.g., to deny only, or read only), and/or which restricted security identifiers are added (to further restrict access). In this manner, certain software can operate without restriction, (other than with the user's normal access token), other code can only operate in a constrained environment, e.g., prevented from accessing data other than its own, and other code can be entirely prevented from running, sometimes referred to herein as a "disallowed" or "revoked" security level, (useful for software files known to cause problems).

In one implementation, prior to loading a file, the various functions (such as of an operating system) that enable software to be loaded or otherwise executed are arranged to automatically and transparently communicate with an enforcement mechanism that determines the rule to apply for each file, based on the identification/classification information of the file. To this end, the enforcement mechanism consults the policy to locate a rule corresponding to the file. Based on located rule, the enforcement mechanism either returns the normal access token, a "disallowed" error that fails the request, (e.g., the function does not load the software), or computes and returns a restricted access token that restricts the software to an extent that corresponds to the security level determined by the rule. If allowed but restricted, the returned restricted token is associated with the code's processes, constraining the code accordingly. The computation of the token or failing of the open may be automatic and transparent to the user, whereby security is implemented without requiring user forethought or action.

Other objects and advantages will become apparent from the following detailed description when taken in conjunction with the drawings, in which:

DETAILED DESCRIPTION

Exemplary Operating Environment

Figure 1:
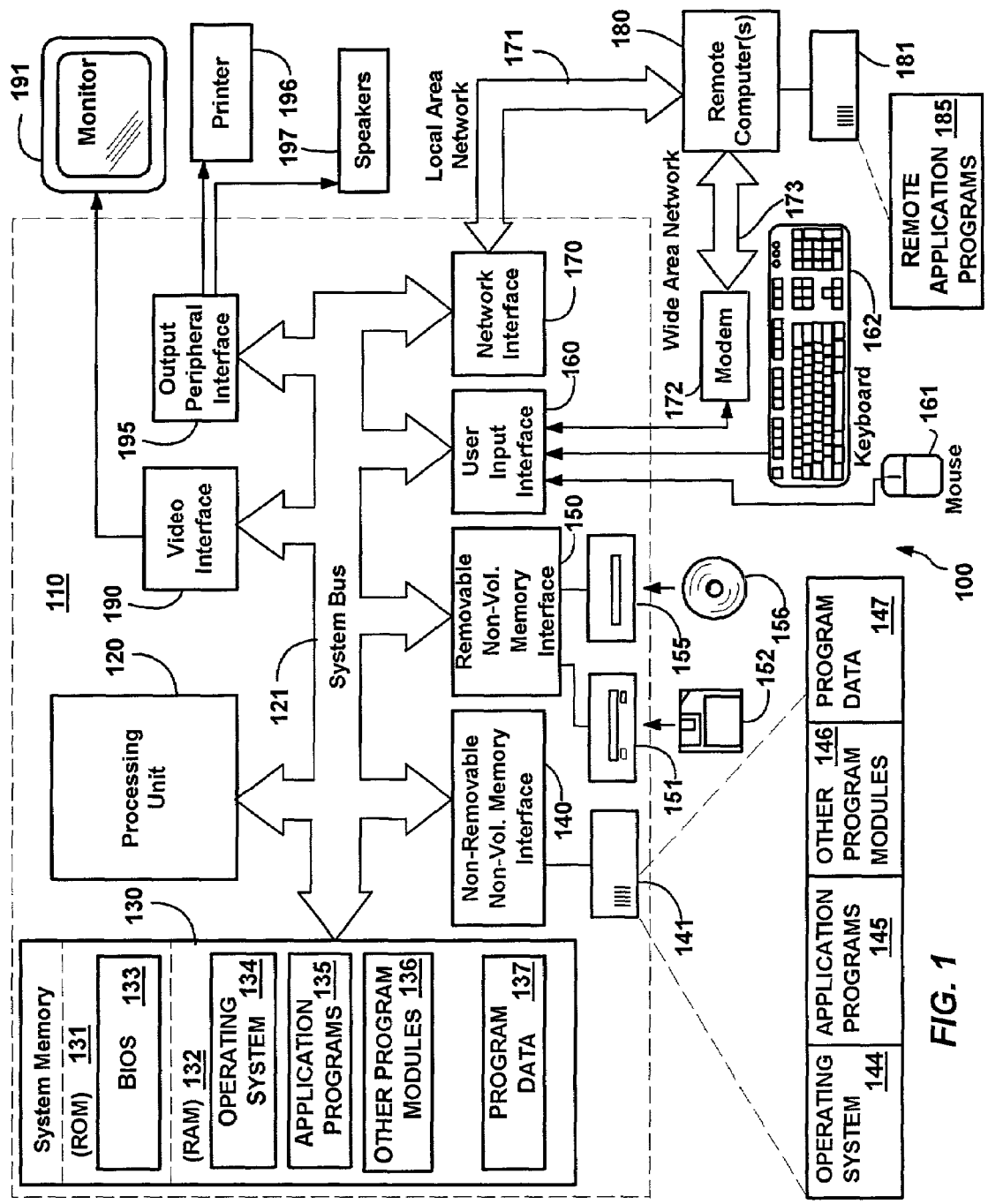
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Restricted Tokens

The present invention is generally directed to restricting what executable code can do, including limiting its access to resources. One way that this can be accomplished with an operating system (e.g., Microsoft Corporation's Windows® 2000) security model is to derive a restricted token from the user's normal access token, wherein the restricted token has less access and/or privileges relative to the normal access token. In addition, the present invention may also be used with software-fault isolation on a per-thread basis, or with a virtual machine where restrictions are determined from the stack of classes currently executing. Moreover, the present invention does not necessarily depend on kernel-mode operation, as with software-fault isolation or a virtual machine it may be implemented in user-mode. Thus, although restricted tokens are generally described herein, as will be understood, the present invention is not limited to restricted tokens, but can be implemented in virtually any security model in which it is feasible to modify executable code's ability to operate based on information known about the executable code, e.g., its source, path information or hash. Lastly, although the various components are shown and described herein as separate components because of certain benefits resulting from separated functionality, it can be readily appreciated that some or all of the components may be combined into more complex components, and/or separated even further into additional components.

By way of general background, computing tasks are performed by accessing the system or network's resources via processes, (actually their threads in multithreaded computing environments, however for purposes of simplicity herein, the entity attempting a task will be referred to a process). Also, the system's resources, including files, shared memory and physical devices, which may be represented by objects, will be ordinarily referred to herein as either resources or objects. When a user logs on to a secure machine or network (such as one running the Windows® 2000 operating system) and is authenticated, an execution environment (context) is set up for that user, which includes building an access token. An access token is associated with each process of the user, whereby anytime a process requests to do work on behalf of the user, the access token can be first checked to see if the process has the appropriate rights and/or privileges to do what is being requested, such as access a resource.

Figure 2:
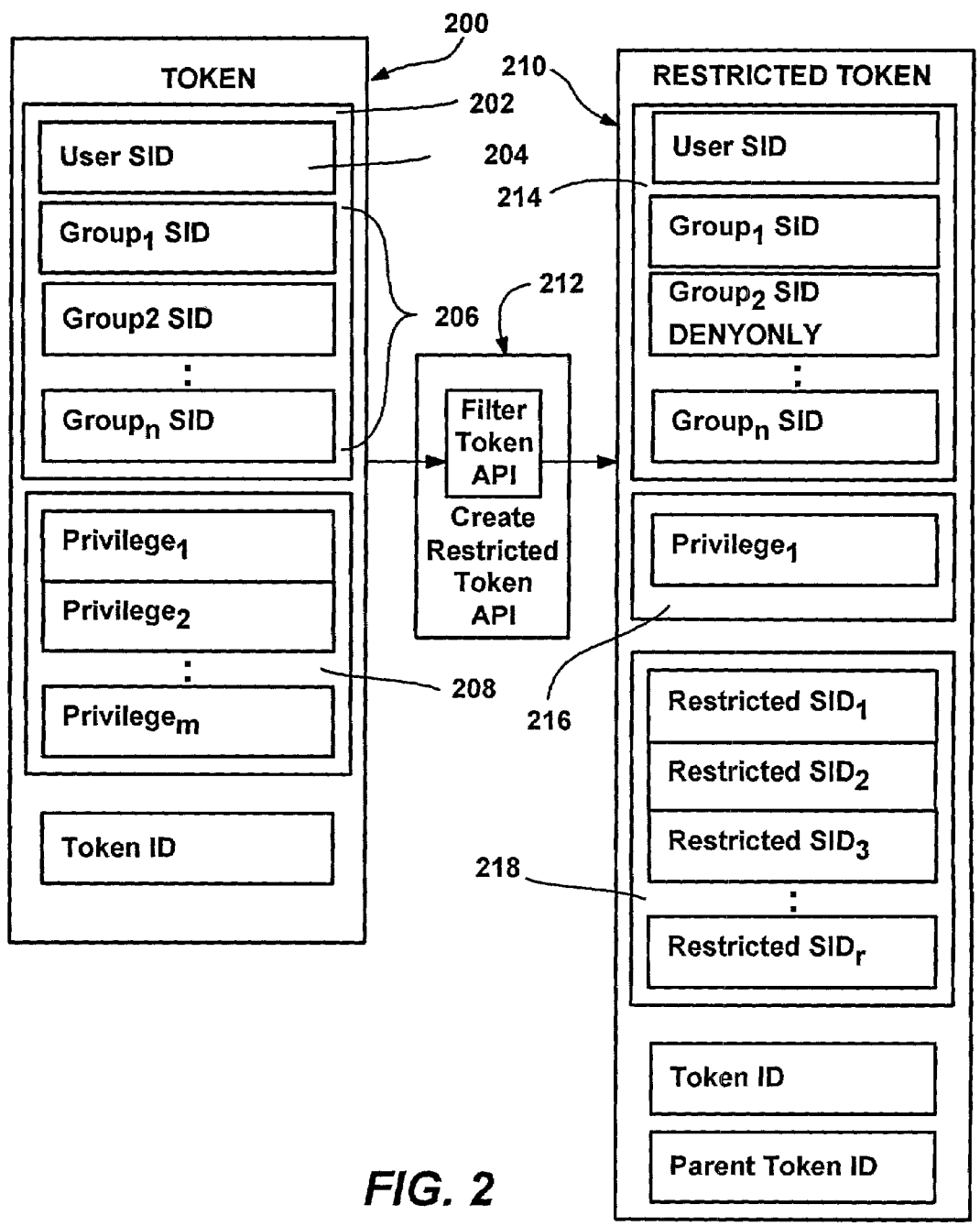
FIG. 2 is a block diagram generally representing the creation of a restricted token from an existing token.

As shown in the left portion of FIG. 2, a conventional user-based access token 200 includes a UserAndGroups field 202 including a security identifier (Security ID, or SID) 204 based on the user's credentials and one or more group IDs 206 identifying groups (e.g., within an organization) to which that user belongs. The token 200 also includes a privileges field 208 listing any privileges assigned to the user. For example, one such privilege may give an administrative-level user the ability to set the system clock through a particular application programming interface (API). Note that privileges override access control checks that are otherwise performed before granting access to an object.

As also represented in FIG. 2, a restricted token is derived from a parent token, and comprises a reduced subset of access rights and/or privileges relative to the parent token. (e.g., the user's normal access token 200). Note that the parent token may be the user's normal token, but can also be a restricted token derived from a higher parent token, and so on in a hierarchical fashion up to the normal token.

In general, as represented in FIG. 2, a restricted token is derived from a parent token by removing at least one privilege therefrom relative to its parent token, altering (lessening) the access rights of at least one security identifier relative to the parent token, and/or by adding a restricted security identifier relative to the parent token. This is generally shown in the right portion of FIG. 2, wherein via a function call to an API (application programming interface) 212 or the like, a restricted token 210 is derived from the parent (normal user) token 200. In the example of FIG. 2, this is accomplished by changing a group security identifier to "DENY ONLY," in group SID field 214, removing privileges, as shown in privileges field 216 of the restricted token 210 relative to the parent token's privilege field 208, and by adding restricted security identifiers to a restricted security identifiers field 218. Note that adding a restricted security identifier actually reduces access, because the presence of any restricted security identifier causes a secondary access check, i.e., the restricted SID field data also needs to pass access control checks before access is allowed, as described below with respect to FIG. 4.

Figure 3:
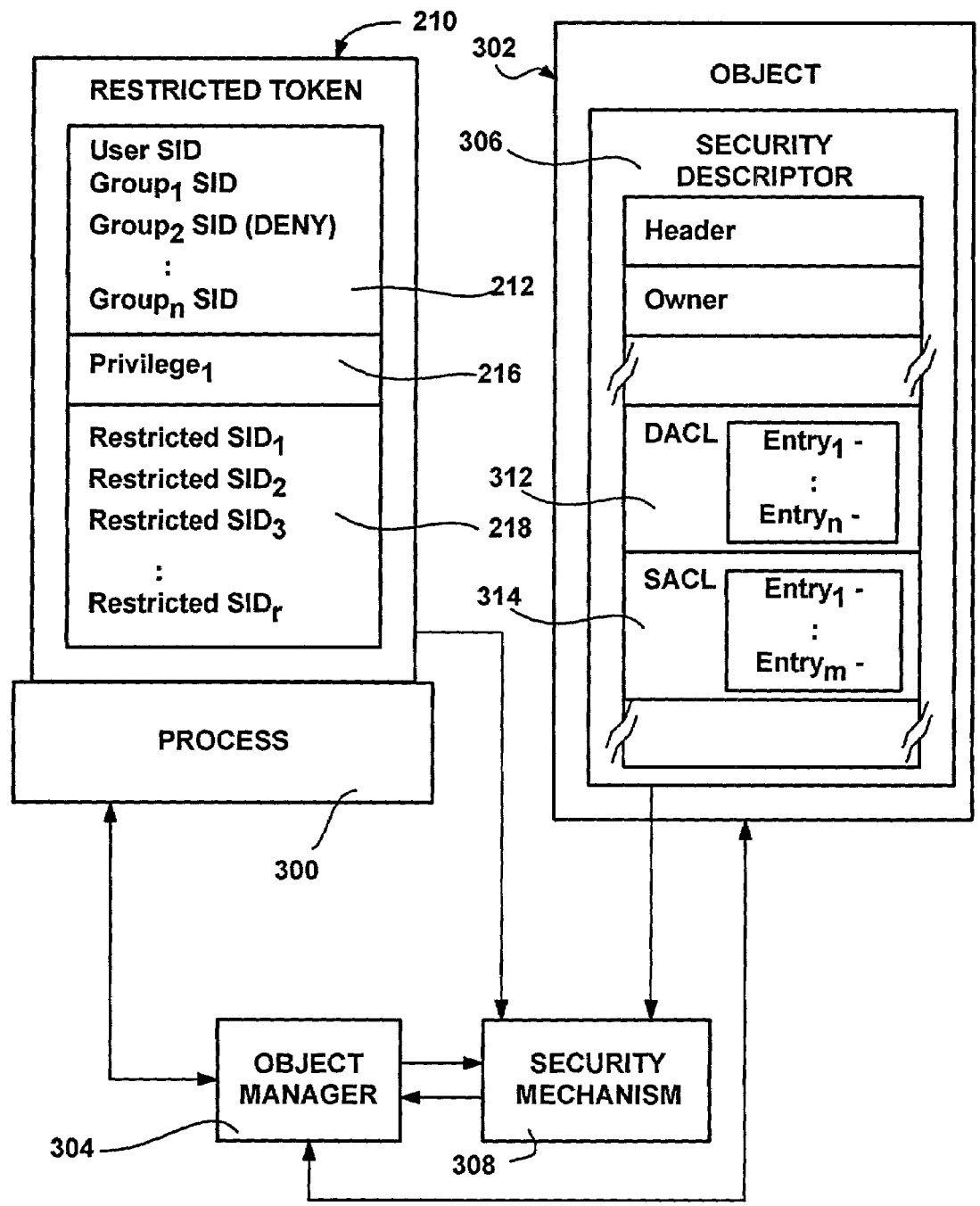
FIG. 3 is a block diagram generally representing various components for determining whether a process may access a resource based on associated security information.

As generally represented in FIG. 3, a process 300 may be associated with the restricted token 210 rather than the user's normal token 200, as determined by the operating system, such as when the process is untrusted, as described below. When the process 300 desires access to an object 302, the process 300 specifies the type of access it desires (e.g., obtain read/write access to a file object), and the operating system (e.g., kernel) level provides its associated token to an object manager 304. In the example of FIG. 3, the token provided is the restricted token 210. As is understood, this restricts what the process 300 can do relative to what the process could accomplish with the parent token. Note that the restricted token may be associated with a job object that effectively contains the process, to prevent the untrusted process from requesting trusted processes to do something on its behalf.

The object 302 has a security descriptor 310 associated therewith, and the object manager 304 provides the security descriptor 306 and the restricted token 210 to a security mechanism 308. The contents of the security descriptor 306 are typically determined by the owner (e.g., creator) of the object, and generally comprise a discretionary access control list (DACL) 312 of access control entries, and for each entry, one or more access rights (allowed or denied actions) corresponding to that entry. Each entry comprises a type (deny or allow) indicator, flags, a security identifier (SID) and access rights in the form of a bitmask wherein each bit corresponds to a permission (e.g., one bit for write access, and so on). The security mechanism 308 compares the security IDs in the restricted token 210 along with the type of action or actions requested by the process 300 against the entries in the DACL 312. If a match is found with an allowed user or group, and the type of access desired is allowable for the user or group, a handle to the object 302 is returned to the process 300, otherwise access is denied.

As also shown in FIG. 3 for completeness, the security descriptor 306 also includes a system ACL, or SACL 314, which comprises entries of type audit corresponding to client actions that are to be audited. Flags in each entry indicate whether the audit is monitoring successful or failed operations, and a bitmask in the entry indicates the type of operations that are to be audited. A security ID in the entry indicates the user or group being audited. Whenever a client belonging to a group being audited attempts improper access, the operation is logged.

The DACL 312 may contain one or more identifiers that are marked for denying access to users or groups access (as to all rights or selected rights) rather than granting access thereto. For example, one entry listed in the DACL 312 may otherwise allow members of "Group$_1$" access to the object 302, but another entry in the DACL 312 may specifically deny "Group$_2$" all access. If the token 210 includes the "Group$_2$" security ID, access will be denied regardless of the presence of the "Group$_1$" security ID. Of course to function properly, the security check is arranged so as to not allow access via the "Group$_1$" entry before checking the "DENY ALL" status of the Group$_2$ entry, such as by placing all DENY entries at the front of the DACL 312. As can be appreciated, this arrangement provides for improved efficiency, as one or more isolated members of a group may be separately excluded in the DACL 312 rather than having to individually list each of the remaining members of a group to allow their access. Also, note that access to objects cannot be safely reduced by simply removing a security ID from a user's token, since that security ID may be marked as "DENY" in the DACL of some objects, whereby removing that identifier would grant rather than deny access to those objects. Thus, a SID's attributes may be modified to USE_FOR_DENY_ONLY in a restricted token.

Note that instead of specifying a type of access, a caller may request a MAXIMUM_ALLOWED access, whereby an algorithm determines the maximum type of access allowed, based on the normal UserAndGroups list versus each of the entries in the DACL 312. More particularly, the algorithm walks down the list of identifiers accumulating the rights for a given user (i.e., OR-ing the various bitmasks). Once the rights are accumulated, the user is given the accumulated rights. However, if during the walkthrough a deny entry is found that matches a user or group identifier and the requested rights, access is denied.

Restricted security identifiers (e.g., in field 218) are numbers representing processes, resource operations and the like, made unique such as by adding a prefix to GUIDs or numbers generated via a cryptographic hash or the like, and may include information to distinguish these restricted security identifiers from other security identifiers. If any restricted security identifiers are present in a restricted token, that token is subject to an additional access check wherein the restricted security IDs are compared against the entries in the object's ACL. For example, a file object resource may have in its ACL a single security identifier identifying a particular application program with access settings such that only restricted processes that have the same applicantion program's restricted SID in its associated restricted token may access the file object. Note that the original user still needs to have access to the object, so to access it, the ACL also needs to contain an access control entry granting the user access, as well as the restricted SID for that particular application program. Then, for example, untrusted code such as downloaded from the Internet could be run in a restricted process that did not have the applicantion program's restricted security identifier in its restricted token, whereby that code could not access that particular file object, even though the user would otherwise have rights to access it.

Figure 4:
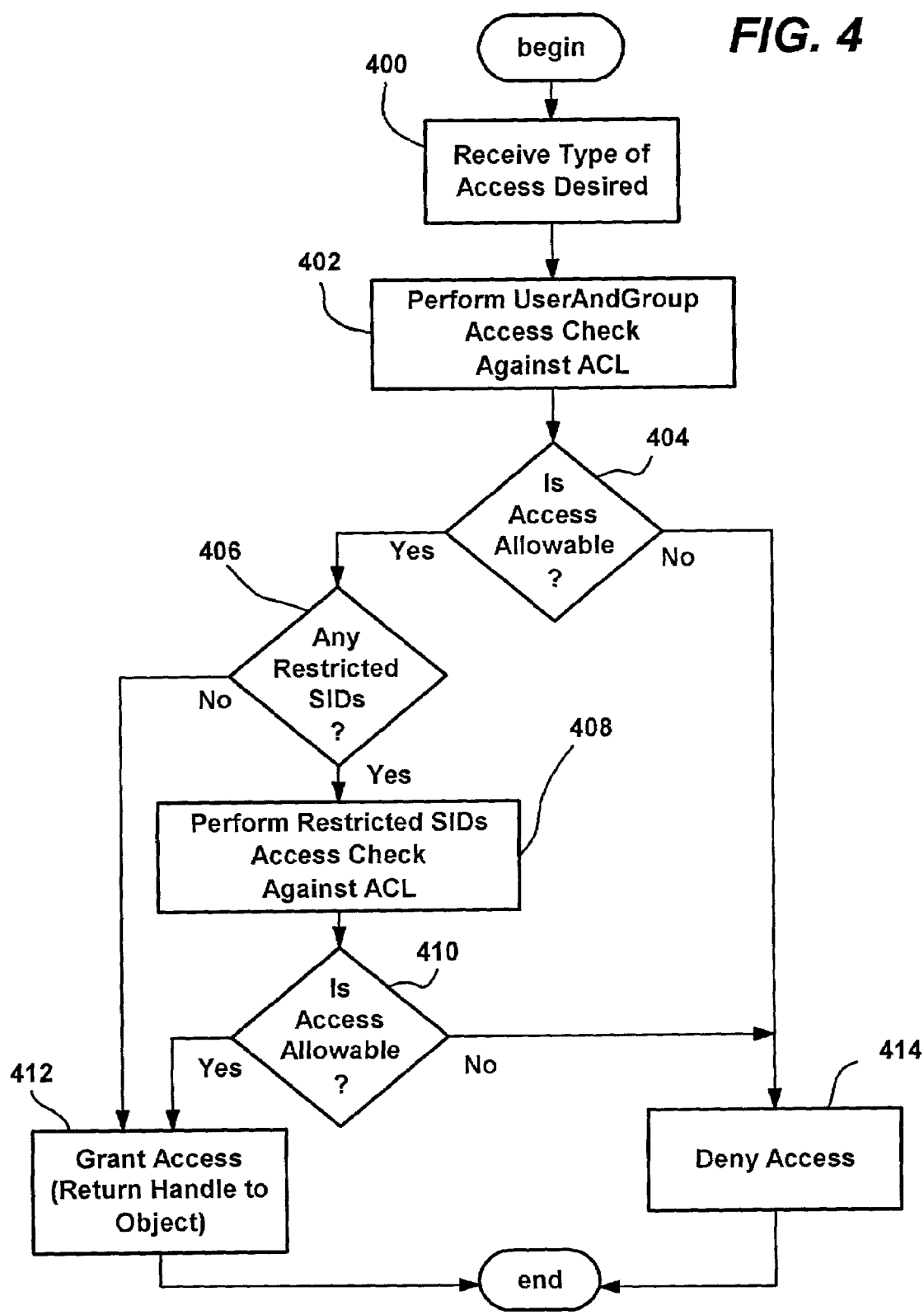
FIG. 4 is a flow diagram representing general steps taken when determining whether to grant a process access to a resource.

In general, both the normal user-credential based access check and any restricted security identifier access check need to be passed before a process is granted a desired type of access to a resource. FIG. 4 generally shows such logic, beginning at step 400 wherein when requesting access to the object 302, the process 300 provides the object manager 304 with information identifying the object to which access is desired along with the type of access desired, as described above. In response, as represented at step 402, the object manager 304 works in conjunction with the security mechanism 308 to compare the user and group security IDs listed in the restricted token 210 (associated with the process 300) against the entries in the DACL 312, to determine if the desired access should be granted or denied.

As generally represented at step 404, if access is not allowed for the listed user or groups, the security check denies access at step 414. However, if the result of the user and group portion of the access check indicates allowable access at step 404, the security process branches to step 406 to determine if the restricted token 210 has any restricted security identifiers. If not, there are no additional restrictions, whereby the access check is complete and access is granted at step 412 (a handle to the object is returned) based solely on user and group access. In this manner, a normal token is essentially checked as before. However, if the token includes one or more restricted security identifiers (such as the restricted token 210 in the above examples) as determined by step 406, then a secondary access check is performed at step 408 by comparing the restricted security identifiers against the entries in the DACL 312. If this secondary access test allows access at step 410, access to the object is granted at step 412. If not, access is denied at step 414.

The design of restricted tokens provides for significant flexibility and granularity within the context of a user to control what different processes are allowed to do. One way in that restricted tokens may be used, described in detail below, enables restricting actions by possibly executable software content, based on a security (trust) level determined for that content. It also should be noted that the restricted token security model may be used in conjunction with other security models. For example, capability-based security models residing on top of an operating system may be used above the operating system-level security model.

Secure Software Execution

In accordance with one aspect of the present invention, there is provided a method and system that determines access to resources based on an identification (classification) of software that may contain executable content. To this end, various types of software and specific software files (or other suitable data structures) may be identified and classified, with rules set and maintained for the software classifications that automatically and transparently determine the ability of software to execute. An administrator identifies/classifies the software and sets the rules, including a default rule that applies to any software file not classified under a specific rule. Once the rules are set, when software is to be loaded (e.g., its file opened and some or all thereof read into memory), one or more rules are located that correspond to the classification for that software, (or if none corresponds, the default rule), and a selected rules is used to determine whether the software can be loaded, and if so, to what extent any processes of the software will be restricted. Note that by allowing the administrator to set a default rule, an administrator can efficiently control software in any environment with only a single rule, and thereafter only deal with any exceptions to that rule.

To identify and classify software, (e.g., maintained in a file), various selectable classification criteria are made available to an administrator, including a unique hash value of the file's content (e.g., via an MD5 image hash), and whether the file is digitally signed, and if so, by what entity. Other criteria for classifying software includes the software's file system or network path, and/or its origin or source, e.g., its URL (Uniform Resource Locator) zone. Other criteria (e.g., identifying the sender of an attachment, or identification information provided by a trusted application) are feasible. For example, an e-mail program can be set to operate normally when accessing its own code, but provide identification information by which attachments are operate in a restricted environment.

By the various criteria, an administrator can efficiently identify and classify similar groupings of software content, yet single out certain software from among the more general groups. For example, software content known to be trusted or as having come from a trusted source can be differentiated from other software sharing the same general path, whereby in keeping with the present invention such trusted content can be run in a different execution environment/context from the other software. Software content known to cause problems can be similarly differentiated from other content. By enabling the identification of software via these or other classification criteria, and then locating and enforcing an appropriate security rule established for the software based on its classification, the present invention automatically controls whether content is executable, and if so, the extent (if any) to which it is restricted.

As mentioned above, one way that a software file can be identified (and thus matched to a corresponding rule) is by a hash of its contents, which is essentially a fingerprint that uniquely identifies a file regardless of whether the file is moved or renamed. Via a user interface or the like operably connected to a suitable hash mechanism, an administrator can select any software file, obtain a hash value from its contents, and enter and associate a rule (that specifies a security level) with that hash value. Multiple files can have their corresponding hash values and rules maintained in a policy object, or otherwise made available to the system, whereby for any given instance of any file, the set of maintained hash values can be queried to determine whether a rule exists for it. In other words, before opening a file for execution, a hash value is determined from that file's contents, and the set of hash value information (e.g., in the policy object) searched to determine if a rule exists for that hash value. If so, that rule provides the security level for the software.

In this manner, an administrator can set a rule for any file based on its unique hash value, with the rule specifying whether (and if so, how) a software file having that hash value will execute. For example, an administrator may not want users to run a particular version of a program, such as if that version is known to have security or privacy bugs, or compromises system stability. Via a user interface, the administrator selects that application version, obtains its hash value, sets up a hash rule for it that specifies a security level, and then records the hash value in conjunction with its rule as described above. In the case of known bad code, the administrator may set the rule to specify that any file with that hash will not be allowed to execute at all (i.e., "disallowed" or "revoked" status). Since the rule along with the hash value is maintained or distributed to the machine, (e.g., via a policy object), whenever a request to open that file is received, a hash of the file matches the saved hash and rule, and that file will not be run. Alternatively, in the case of known good code that is allowed to execute, a hash rule can specify how it will be executed, e.g., unrestricted (normal) or restricted (and to what extent). Note that any change to the content of the file, even a small patch or version upgrade, changes its hash, whereby the hash rule for a certain file may need to be frequently updated, and thus the hash rule is likely to be used for only a limited number of select files.

Another type of rule allows a software publisher digital signature (e.g., certificate) to be specified and maintained, along with a security level for files having that certificate. For example, if an enterprise digitally signs its internally developed controls, it can specify that software signed by its own publisher certificate runs normally, and also without unnecessarily prompting its users with a dialog or the like before allowing the open. Note that policy can override expiration and other external certificate-related checks. Further, note that it is straightforward to have additional information be maintained in a rule and evaluated along with the signature, for example, to allow certain controls to run normally, but not others. For example, this can be accomplished by having a multi-part rule that checks for allowed/restricted/disallowed signatures and allowed/restricted/disallowed control identifiers, and taking the most restrictive result from the evaluated parts of the rule. Moreover, the user interface provides an option that determines exactly who can specify which publishers are trusted, e.g., a domain administrator, any administrator, and/or an end user, with any higher-level administrator able to block those below from changed the setting.

Another rule that can be applied to software is based on identifying and classifying a file by the specific folder it is in, or based on its fully qualified path. When a path rule specifies a folder, the rule may be applied to any software files contained in that folder and any software files contained in sub-folders, to determine how the files therein can be executed. For example, an administrator may set up a default rule that generally restricts files, (those that do not have another rule associated therewith), and also specify a path rule that allows files in the system folder to run with normal user access, so that the computer will work normally. At the same time, the administrator may complement the path (and other) rules using conventional access control technology, such as via discretionary access control lists, to prevent the user from writing to the system directory. In this manner, the administrator can generally restrict user files, yet set the system files to run normally, while being assured that the user or another program cannot simply defeat this setup by placing unknown files in the system directory.

A path rule can be applied to all the files in a folder, or only those that have certain file extensions specified for the folder. For example, rather than restrict all files in a given folder or path, an administrator can elect to restrict only certain types such as .exe, .com, .bat, .vbs and so on. It is also feasible for an administrator to set different restrictions or revoke certain files based on their extension. Also, it is feasible to have the extension information be selectively inheritable by sub-folders. An extension list may be maintained per folder, or alternatively, each rule may have its own associated list. The list may be edited, e.g., to add new extensions as new executable file types become available, or to remove others if desired.

A path rule can use environment variables, which generally identify folders having names that may vary from one environment to another, e.g., per user or machine. For example, some useful environment variables include % HOMEDRIVE %, % HOMEPATH %, % USERPROFILE %, % WINDIR %, % APPDATA %, % PROGRAMFILES %, and % TEMP %, wherein each environment variable may represent a path to a folder that serves a similar or identical role on many machines but with a name that may vary from machine to machine. Since path rules are evaluated in the client environment, the ability to use environment variables allows one rule to be adapted to multiple users' environments without having to specifically know the exact path and folder name for each user. The system registry may contain path information in various keys, and the registry may be queried to find a path, e.g., that varies based on the current user.

By way of an example similar to that above, in some environments, users will not have write access to the system directory, and an administrator may want to allow anything in the system directory to run, since these programs are needed for normal system operation. However, rather than having to specify the exact path for each machine, which can vary from user to user, the administrator can create a path rule using an environment variable to that specifies that anything in the "% WINDIR % directory or below runs normally, i.e., unrestricted.

Moreover, because as described below more specific path information takes precedence over less specific path information, the administrator can further make rules to prevent specific programs in this directory from running. For example, the administrator can set the system folder to run normally, but more particularly identify a file under that folder and set a rule for it, such as to disallow the registry editor from running at all. As described above, this can be done either by the precise path and filename (e.g., \WINNT\system32\regedit.exe or by an environment variable and the filename (e.g., % WINDIR %\system32\regedit.exe). Note that as also described above, this can also be accomplished via a hash rule for this file.

A zone rule may also be specified, wherein the zone identifies software according to the source (e.g., the URL zone or the like) from which it is downloaded or otherwise installed. Typical such zones presently include Internet, Intranet, Trusted Sites, Restricted Sites and also local machine (e.g., My Computer) zones. In this manner, an administrator can set different rules for software files classified according to their source.

The set of rules for a machine or user may be maintained in a restriction policy for that user and machine, e.g., within one or more group policy objects distributable over a network, to correlate the classification information for any software file to a security level that may restrict or prevent the software from running. Rules can also be set for a user or machine locally and maintained in the local system registry, e.g., under HKEY_LOCAL_MACHINE and HKEY_CURRENT_USER. As described below with respect to FIGS. 5A and 6, the various policies for a given machine and its current user are combined into an effective policy 502, from which the rules may be made available to a mechanism that enforces them.

Figure 5A:
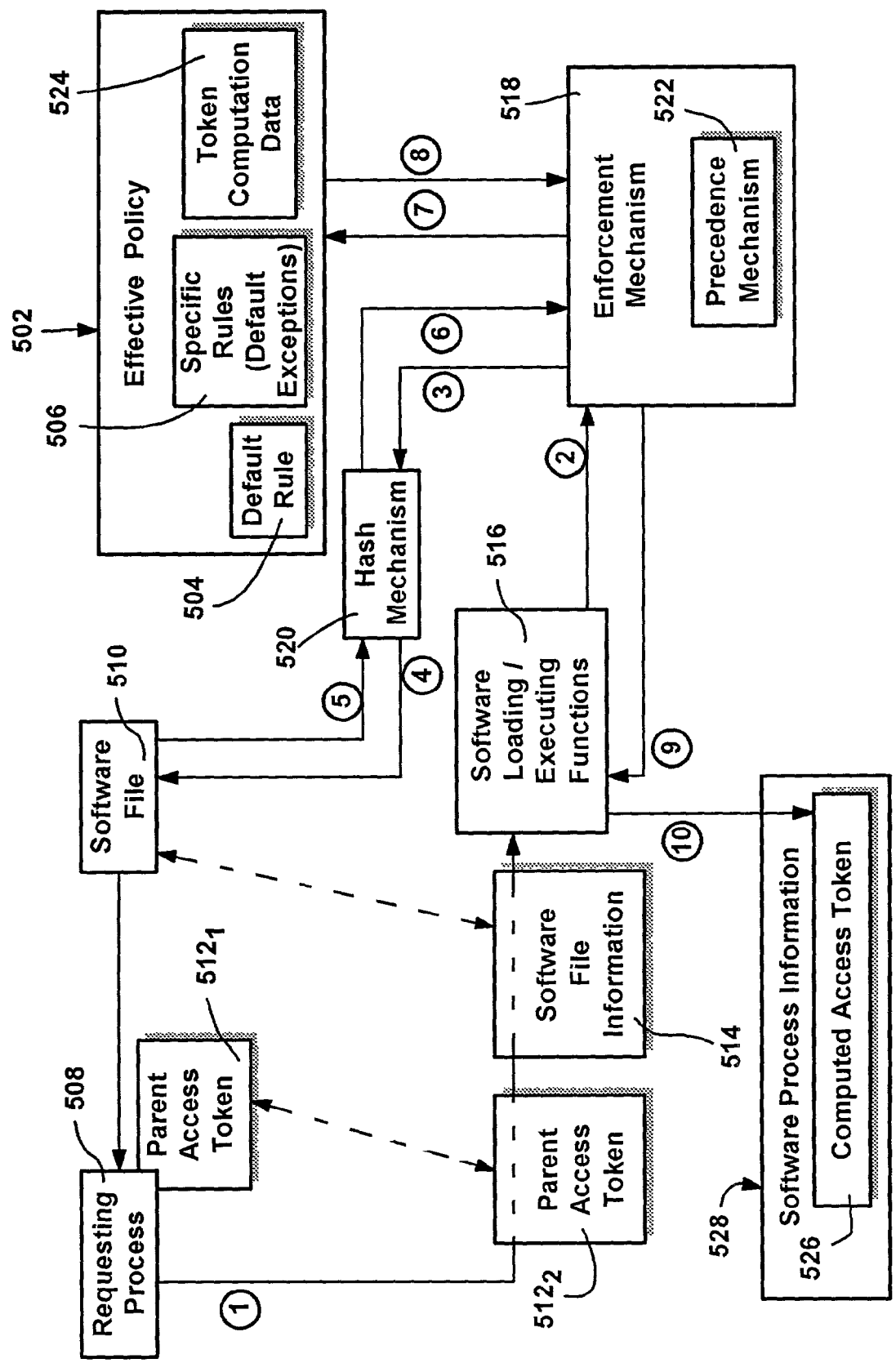
FIGS. 5A-5C are block diagrams generally representing various components for restricting software based on a rule for that software, in accordance with one aspect of the present invention.

As generally represented in FIG. 5A, the effective policy 502 generally comprises the general (default) rule 504 and a set of specific rules 506 which set forth the exceptions to the default rule 502. In this manner, for example, an administrator can efficiently restrict or prevent from running everything on a machine, except for certain identified code. Alternatively, an administrator can allow everything to run at one security level, such as with the user's normal rights, except for certain identified/classified software files. For content that has multiple classifications, (e.g., it fits a specified pathname and also has an associated hash), and thus may have multiple, possibly conflicting rules, a precedence mechanism is described that establishes which rule, and thus which security level, applies. In general, the precedence mechanism favors more-specific content identification information over less-specific information.

As further shown in FIG. 5A, a process 508 such as a process of a user or application requesting to open a software file 510 has an access token $512_1$ associated with it, (actually maintained by the operating system in protected kernel mode memory when the process is created). When the process 508 wants to load and possibly execute the software file 510, it identifies itself and provides information 514 identifying the software file to an appropriate function 516 (of a set) that can open, load and/or execute the file 510. For example, this can be accomplished by placing an application programming interface (API) call to the operating system, wherein the file information 514, typically in the form a path and filename is passed, as a parameter. In FIG. 5A, the arrow labeled with the circled numeral one (1) generally represents such a call from the requesting process 508 to the one of the functions of the set 516. Along with the path and filename, the software information 514 can also include a digital signature and/or data about the source of the file, e.g., its originating source in the form of an Internet zone category, for example, (or alternatively this additional information can be determined via the path and filename). Note that in a typical implementation, the software opening function 516 comprises an operating system component, and thus has access to a copy $512_2$ of the parent access token. Further note that such function calls are already the typical way in which files are loaded, and thus the process 508 (which may be of an existing application program or other type of component) need not be modified in any way.

In accordance with one aspect of the present invention, security is provided based on the classification of the file, which is determined from the software file information and/or the content of the software file 510. To this end, instead of simply loading the file and executing any executable code therein with the parent token's rights and privileges, each of the functions 516 is arranged to first provide the software file information 514 to an enforcement mechanism (circled numeral two (2) in FIG. 5A). As described below, based on this information the enforcement mechanism consults the effective policy 502 to determine which rule applies for the file 510, and from the rule determines whether to open/execute the file, and if so, the extent of any restricted execution context for the file 510.

More particularly, the enforcement mechanism 518 may call (or include in its own code) a hash function 520 or the like to obtain a hash value from the contents of the software file 510, as generally represented in FIG. 5A by the arrows labeled with circled numerals three (3) to six (6). As described above, a suitable hash function 520 provides a unique fingerprint of the software file 510, while the effective policy 502 may have a specific rule for that hash. Also, the enforcement mechanism 518 can locate a rule from the signature, path information, or zone information associated with the file 510. Note that while FIG. 5A essentially represents accessing the policy to get the rule or rules via arrows labeled seven (7) and eight (8), the policy may be consulted more than once, e.g., to look first for a rule for the hash value, and if not found, for a rule for a signature (if any), and so on. Note that as described below with respect to FIG. 7, the order of seeking a corresponding rule can thus determine the precedence order, in other words, by looking for a rule in the order of precedence and applying the first one that the file matches, or if none match, applying the default rule.

In this manner, the enforcement mechanism 518 obtains a security level from the appropriate rule based on a precedence order that determines which rule applies when a file fits multiple classifications. The precedence mechanism 522 can be included (e.g., hard-coded) into the enforcement mechanism 518, or alternatively can be accessed from an external source, such as the effective policy, to facilitate the adding of new classifications. In any event, only one rule has precedence, and based on the rule that applies, the enforcement mechanism 518 obtains a security level indicative of whether the file 510 can be executed, and if so, the extent of any restricted execution context for any processes of the file 510. Note that rather than have a precedence mechanism that determines only one possible execution context, it is feasible when multiple conflicting rules apply to have a user select from a set or subset of conflicting security levels, however for purposes of simplicity, the precedence mechanism described herein provides only one resulting rule/security level.

In the restricted token security model, the enforcement mechanism 518 can compute and associate a restricted token with the software file 510, whereby if creation of a process is requested for the software file, (it includes executable content), any process of the software file is restricted in its access rights and privileges according to the restricted token. To this end, the enforcement mechanism may include or otherwise consult (e.g., in the effective policy 502) token computation data 524 to determine which privileges to remove, which security identifiers to modify and/or which restricted security identifiers to add when deriving a restricted token from the parent token.

As represented by the arrow labeled nine (9) in FIG. 5A, the enforcement mechanism 518 completes the call and returns information back to the software function 516 that called it, the returned information essentially including an instruction on whether to open the file, and if so, the token to associate with the file. If a token is returned, it may be the parent token (unchanged) if no restricted execution environment is required by the rule, or a restricted token that establishes a restricted execution environment/context for the processes of the software file 510. The returned token, (alternatively referred to herein as a computed token 526 even if it is unchanged) is maintained in a set of process information 528 (e.g., in a protected location) associated with that file, as generally represented in FIG. 5A by the arrow labeled ten (10). If the computed token 526 is a restricted token, the process of the software file can now execute, but only in association with the restricted token, thus providing the rule-determined secure execution environment.

The various functions 516 that can be arranged to consult the enforcement mechanism 518 include a create process function, a load library (e.g., a dynamic link library) function, a shell execute function, an object creation function (e.g., CoCreateInstance), script running functions and software installer functions. Because some of these functions call each other, (e.g., the shell execute function calls the create process function, the object creation function calls the load library function), a flag is set once the enforcement mechanism 518 has been called by any function, whereby other function know of the call and the enforcement mechanism 518 is only consulted once per call. Also, note that the software installer function may call the enforcement mechanism 518 only once for an entire installation rather than separately throughout the installation process.

In general, code execution is initiated in two forms, external to the executing host and internal to the executing host. An example of external includes native code such as an ".exe" file that starts at CreateProcess, which is outside of the code that needs to be restricted. Another, more complex example includes launching a "vbs" file, where the execution is figured out in a ShellExecute function, which determines the host application (wscript.exe) and then launches it with the VBS file as parameter. Such external situations can be protected by making the invoking code (CreateProcess, LoadLibrary, ShellExecute, COM out-of-process activation) honor the software restriction policies, and, for example, modifying programs that deal with attachments to use a special folder by default when double clicked, (although optionally allowing a user to consciously choose to save it elsewhere).

An example of internal code initiation includes typing a URL reference to an HTML file within an HTML interpreter's text box, wherein the HTML file is executable and the HTML interpreter is the hosting application. In this case, the hosting application needs to be conscious that it may execute code, and needs to honor the software restriction policies. One model for this comprises a separate process model, wherein the host starts another, restricted instance of itself to execute the code. Another model is an in process model, wherein the host impersonates the restricted token and executes the code within the process, e.g., an HTML mail message is opened by an e-mail program, with only the script portions of it restricted. Note that this is relatively less safe, given that the boundary between native and non-native code may be difficult to distinguish. Various scripting engines (e.g., VBSCRIPT, JSCRIPT, VBA) may be modified to honor the software restriction policies at the thread level. To this end, anything providing an in process execution environment (e.g., command/batch processors, scripting engines and so on) may call APIs or the like to honor the software restriction policies. Note that a program cannot gain greater access rights and/or privileges than what runs it, e.g., if the process providing a command prompt is constrained, so is any program that runs via that command prompt, regardless of whether the program can run without constraints otherwise.

Figure 5B:
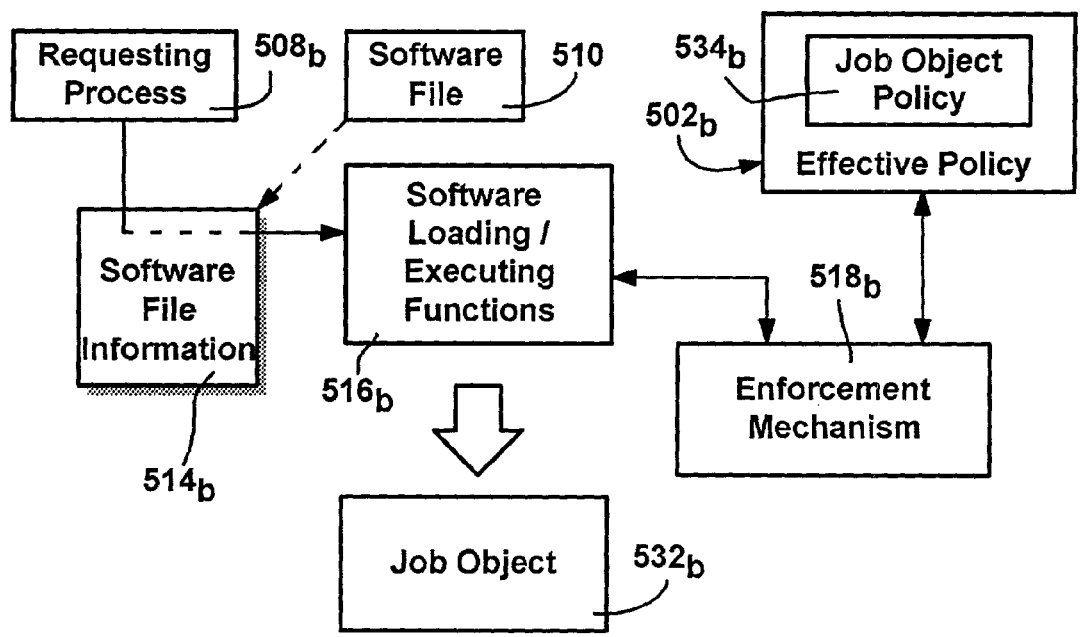
Figure 5C:
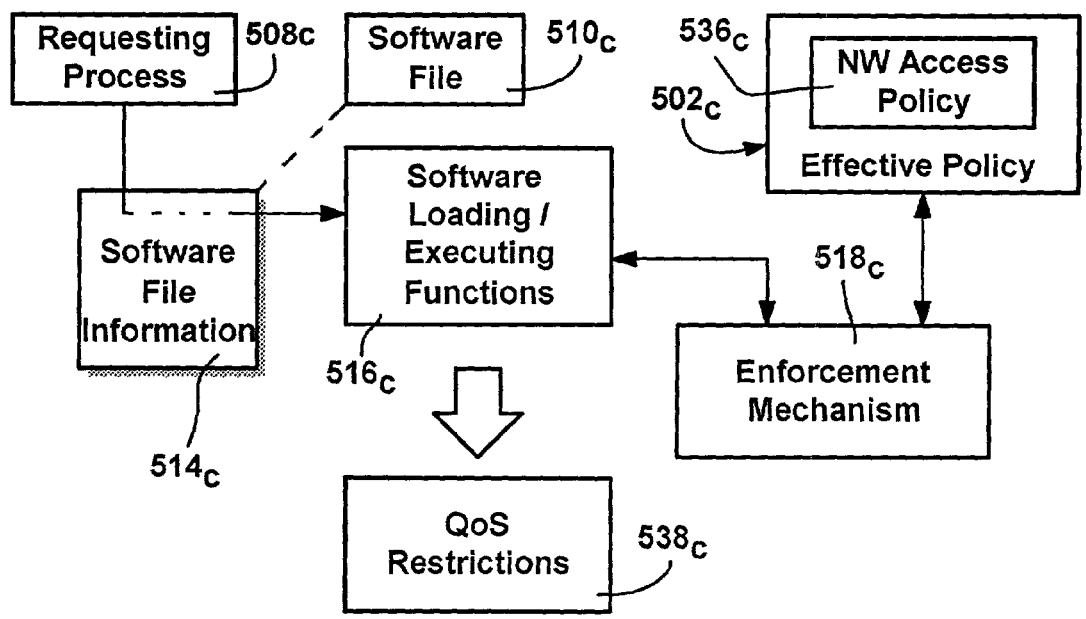

FIGS. 5B and 5C represent other ways in which a software program's execution can be constrained in accordance with the present invention. In FIG. 5B, a software program (e.g., its processes) can be run in a job object. As is known, a job object can have certain limitations associated therewith, such as not consuming more than some limited amount of memory, processor time or total time, and so forth. Job objects can have more specific limitations, such as not having access to a top-level window, not being able to read off of the system clipboard, only running at a certain time of day, and so on. A job object can also have a restricted token associated therewith.

As represented in FIG. 5B, in a manner similar to that described above with respect to FIG. 5A, the present invention can generate a suitable job object $532_b$ for a software file $510_b$ based on that file's software information $514_b$ and a job object policy $534_b$. The job object policy $534_b$ specifies, for example, the limitations for each job object generated based on the rules for the software file's classification, e.g., a file digitally signed with one certificate can correspond to one type of job object. Thus, when a process $508_b$ requests that the file $510_b$ be run, the software loading/executing functions $516_b$ call the enforcement mechanism $518_b$, which in turn consults the policy $502_b$, and thereby receives a security level or the like corresponding to a job object having appropriate limitations for that file.

In another alternative, as represented in FIG. 5C, network access policy data $536_c$ may be used to generate network quality of service (QoS) restrictions $538_c$, in a similar manner. In this way, a particular program or class thereof can be prevented from obtaining network access or otherwise restricted to some reduced level of network access. As can be readily appreciated, the present invention can combine these and other ways (e.g., restricted token, job object and/or QoS restrictions) of restricting the execution environment of software programs.

Figure 6:
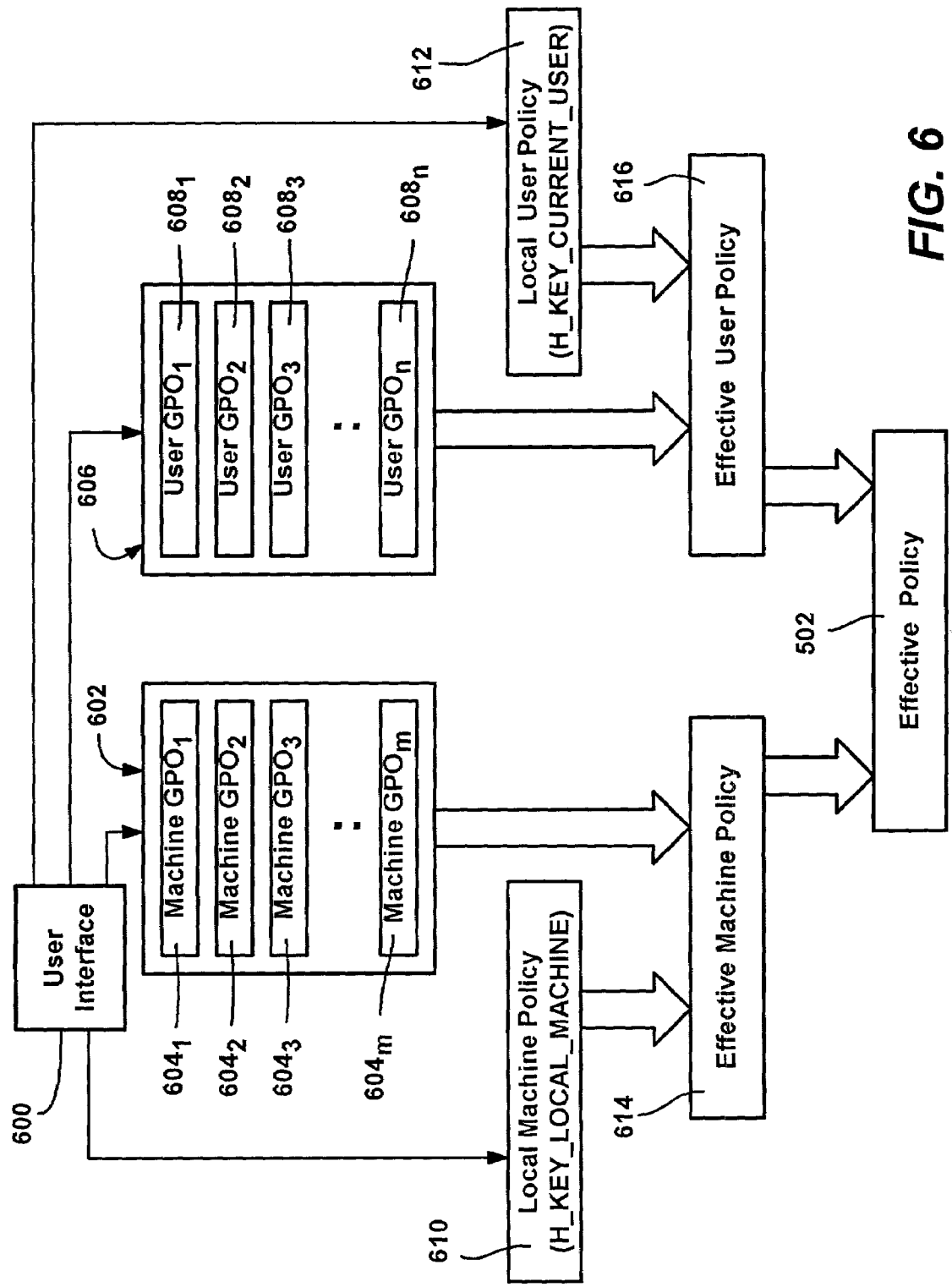
FIG. 6 is a block diagram representing a general architecture for constructing an effective policy for use in restricting software in accordance with one aspect of the present invention.

Turning to an explanation of a suitable policy framework, as generally represented in FIG. 6, via a user interface program 600, e.g., a management console snap-in, an administrator (possibly multiple administrators) constructs the various polices that make up the effective policy 502. To this end, the administrator may provide a set 602 of one or more machine group policy objects $604_1$-$604_m$, which may determine the policy for the machine, a set 606 of one or more machine group policy objects $608_1$-$608_n$, which may determine the policy for the user and groups. Also, the administrator (or the user) may construct and locally maintain local machine policy 610 and local user policy 612, such as in the system registry. These various policies may be combined into an effective machine policy 614 and an effective user policy 616, and those may be combined into the effective policy 502.

Figure 7:
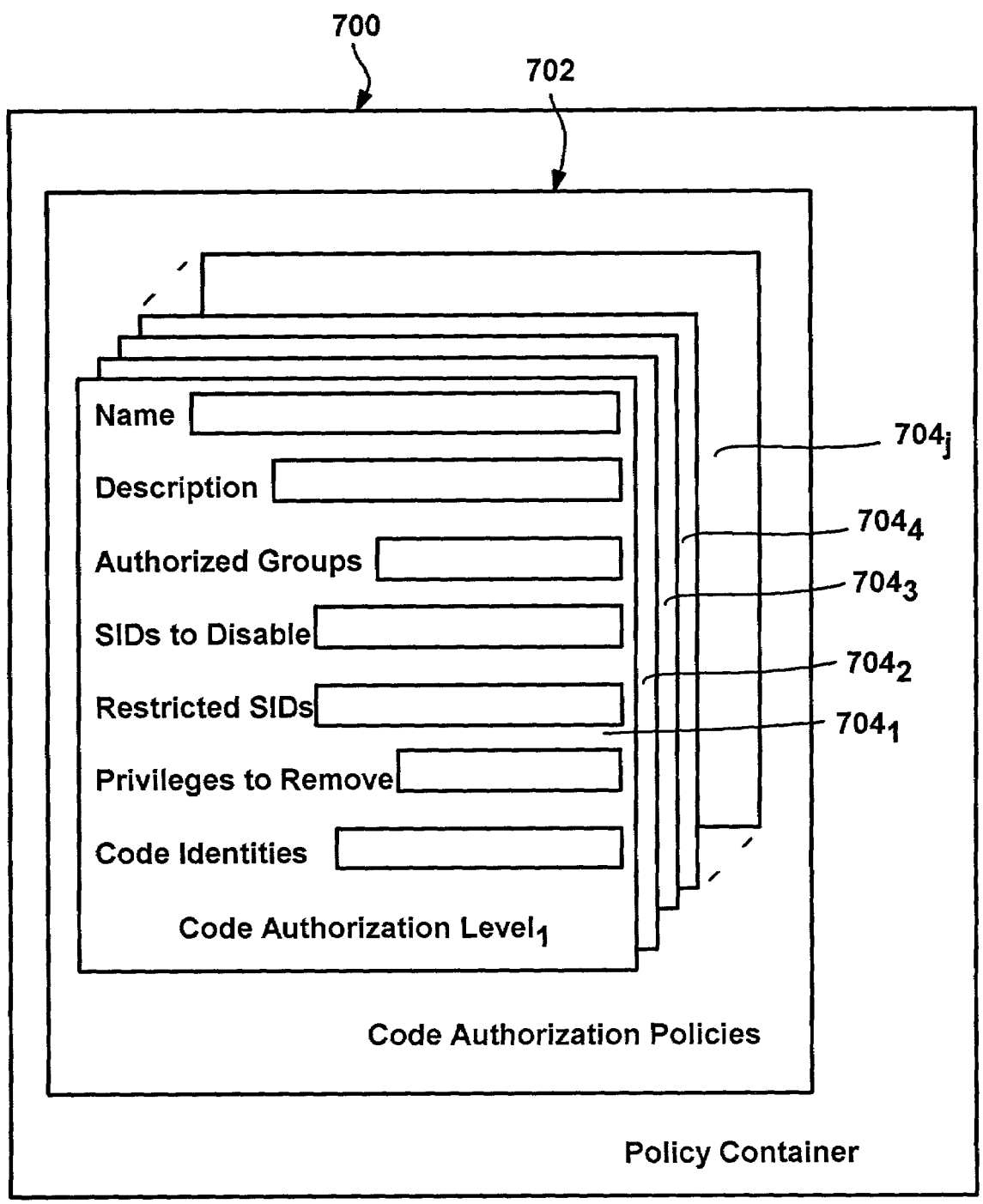
FIG. 7 is a block diagram representing various data structures for maintaining code authorization policies used in controlling software execution in accordance with one aspect of the present invention.

As generally represented in FIG. 7, each policy container 700 (e.g., user or machine group policy objects, or local user or machine policies) may include a code authorization policy 702. The code authorization policy 702 typically contains multiple code authorization levels $704_1$-$704_j$ that each specify what restrictions will be enforced and what software images will be authenticated at that level and enforced with those restrictions. For example, there may be one authorization level for unrestricted operation, one for end-user, one for constrained, one for untrusted and one for revoked, although more or less than these can be present. As described below, these levels provide the information that the enforcement mechanism 518 uses to determine whether and how (restricted) software is to be executed. In general, each code authorization level corresponds to a security level and includes a Name field, a Description field, an Authorized Groups field, a SIDs to Disable field, a Restricted SIDs field, a Privileges to Remove field, and a Code Identities field (that maintains default data if not at any other level). Note that these fields may include lists of relevant information, and that some of these fields may be empty.

The group policy objects $604_1$-$604_m$ and $608_1$-$608_n$ may be provided by administrators per site, domain, organizational unit, group and user. Among other things, group policy technology also provides a flexible and hierarchical way in which each administrator can establish which policies will win out over others if multiple policies conflict. For example, site policies can be set up to prevail over domain policies, which in turn can be set up to prevail over organizational unit policies, which can prevail over group and user policies, which can prevail over local policies. However, policies set at each of these sources may be configured so as to be capable of being overridden by lower level policies, whereby such policies are essentially only suggested policies.

For example, one policy that may be desirable for all users and machines and should not be overridden is one that allows the user interface program 600 to be run (at least by an administrator) regardless of the default rule. For example, this can be accomplished by creating a hash rule for the user interface program 600, and then placing the hash rule in a high level (and also local) policy that cannot be overridden. As can be appreciated, this guards against an error wherein the default rule is set to prevent (revoke) all software from running, which could then otherwise prevent the user interface program 600 from subsequently running to except itself from the default rule. Note that other such standard rules can be provided.

The following table provides some policy/rules examples:

| | | | |
|---|---|---|---|
| OnlySignedLockDown | HKCU | Disallowed | CP only |
| Path | %windir% | Unrestricted | All file types |
| Certificate | <publisher cert> | Unrestricted | |
| IexploreOnly-LockDown | HKCU | Disallowed | CP only |
| Path | %windir% | Unrestricted | All file types |
| Path | %programfiles%\Internet Explorer\ | Unrestricted | All file types |
| WMPOnlyLockDown | HKCU | Disallowed | CP Only |
| Path | %windir% | Unrestricted | All file types |
| Path | %programfiles%\Windows Media Player | Unrestricted | All file types |

-continued

| | | | |
|---|---|---|---|
| PFNoMediaLockDown | HKCU | Disallowed | CP Only |
| Path | %windir% | Unrestricted | All file types |
| Path | %programfiles%\ | Unrestricted | All file types |
| Path | %programfiles%\ Windows Media Player | Disallowed | All file types |
| Hash | wmplayer.exe | Disallowed | N/A |
| OfficeAllowLock-AllDown | HKCU | Disallowed | CP/LL |
| Path | %windir% | Unrestricted | All file types |
| Path | %programfiles%\ microsoft office | Unrestricted | All file types |
| OfficeWordOnly-LockAllDown | HKCU | Disallowed | CP/LL |
| Path | %programfiles%\microsoft office\office\excel.exe | Disallowed | <exact match> |
| Path | %programfiles%\microsoft office\office\powerpoint.exe | Disallowed | <exact match> |
| Path | %programfiles%\microsoft office\office\frontpg.exe | Disallowed | <exact match> |
| Path | %programfiles%\microsoft office\office\outlook.exe | Disallowed | <exact match> |
| NoAttachments-LockAll | HKCU | Unrestricted | CP/LL |
| Path | %USERPROFILE%\local settings\temporary internet files\OLK* | Disallowed | All file types |
| DangerousAppsLock | HKCU | Unrestricted | CP |
| Hash | Regedit.exe | Disallowed | N/A |
| Hash | Regedt32.exe | Disallowed | N/A |
| Hash | cmd.exe | Disallowed | N/A |
| Path | %WINDIR%\system32\cmd.exe | Disallowed | <exact match> |
| Path | %WINDIR%\system32\regedit.exe | Disallowed | <exact match> |
| Path | %WINDIR%\system32\regedt32.exe | Disallowed | <exact match> |
| InnocuousLockAll-Machine | HKLM | Unrestricted | CP/LL |
| Path | %windir%\system32\GDI32.DLL | Unrestricted | <exact match> |
| Path | %windir%\system32\ntdll.dll | Unrestricted | <exact match> |
| Hash | %windir%\system32\shell32.dll | Unrestricted | <exact match> |
| Hash | %windir%\system32\kernel32.dll | Unrestricted | <exact match> |
| NoVBS | HKCU | Unrestricted | CP/LL |
| Path | %WINDIR%\system32\scrrun.dll | Disallowed | <exact match> |
| Path | %WINDIR%\system32\cscript.exe | Disallowed | <exact match> |
| TrustedPublishersLock | HKCU, only admins can add publishers | Unrestricted | CP |
| Certificate | Stock ticker publisher | Unrestricted | |
| Certificate | xenroll publisher | Unrestricted | |
| Certificate | MSNBC news publisher | Unrestricted | |

Figure 8:
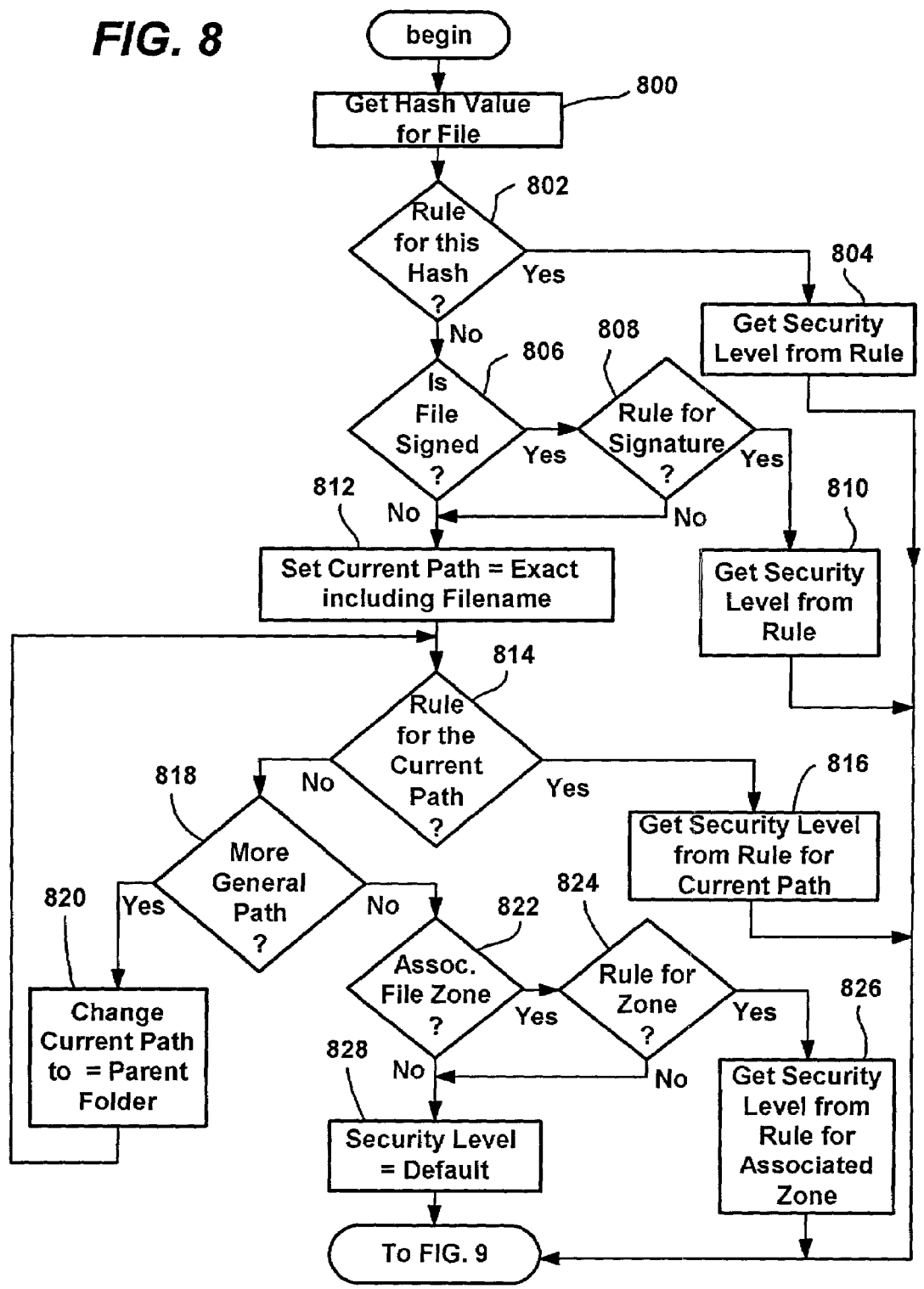
FIG. 8 is a flow diagram representing general steps that may be taken to determine whether and how software is to be restricted in accordance with one aspect of the present invention.

Turning to an explanation of the operation of the enforcement mechanism, one way in which the enforcement mechanism can locate the correct rule and its corresponding security level data is generally represented in FIG. 8. Note that FIG. 8 is only one possible example of a way to locate the applicable rule according to a precedence order, (first hash, then signature, then path and then zone, before default) and that many others are feasible. In any event, beginning at step 800, when the enforcement mechanism 518 is called with file information, e.g., the file information 514 for the software file 510 of FIG. 5A, the enforcement mechanism 518 gets a hash value for this software file 510. Step 802 represents the searching of the effective policy 502 for this hash value. If the corresponding hash value exists in the effective policy, i.e., there is a hash rule for this file, step 802 branches to step 804 wherein the security level (e.g., normal, disallowed or constrained, which may be represented numerically) is obtained from the rule data. At this time, the enforcement mechanism then can use the security information in some way, such as described below with respect to FIG. 8 wherein the security information may be used to compute a restricted token.

If at step 802 no hash rule existed for this file's hash, the enforcement mechanism instead branches to step 806 to determine whether the file is signed. If so, step 806 branches to step 808 to determine whether a digital signature (e.g., certificate) rule exists for this signature. If a rule does exist, step 808 branches to step 810 wherein the security level is obtained from the rule's data, and can thus be used to determine whether the file can run, and if so, with what execution context as determined from the security level.

If the file was not signed, or was signed but no rule existed for that signature, steps 812 and 814 are executed to look for whether there is a rule corresponding to the exact path and filename. As mentioned above, a rule for a more specific path wins out over a more general path, e.g., a rule for c:\folder1\folder2\filename.ext wins out over a rule for c:\folder1\folder2\, which in turn wins out over c:\folder1\. If there is a rule for the exact filename, step 814 branches to step 816 wherein the security level for determining the file's execution ability is obtained from that rule. Note that although not shown in FIG. 8, it is possible for two rules to exist for a given folder, e.g., one specified via an environment variable and one specified by a specific path. In such an instance, (and any time more than one rule may apply at the same precedence level), the most restrictive security level from among the applicable rules is used.

If there is no exact match at step 814, step 814 branches to step 818 to determine if there is no more general path that can be tested, e.g., based on whether the tested path was already at the root directory (or other suitable stopping point). If so, there is no applicable path rule for this file, and the enforcement mechanism branches ahead (to step 822) to evaluate whether a zone rule can be applied.

If there is a more general path that can be tested at step 818, step 818 branches to step 820 wherein the path to be tested for a corresponding rule moves up to the parent folder. Step 820 then loops back to step 814 to search for a corresponding rule, and so on. In other words, if the effective policy was unsuccessfully searched for a rule corresponding to the exact path\filename provided, the policy is searched for a rule that corresponds to the filename's parent folder in the path, and so on up the path hierarchy until a match is found at step 814, or there is no parent at step 818.

If no path rule exists, the enforcement mechanism looks for whether a zone rule can apply, beginning at step 822 wherein the file information is evaluated to see whether there is an associated file zone. Note that step 822 may be unnecessary if every file has a zone or a default zone is assumed for files. In any event, if there is a zone, a rule is looked for that corresponds to the zone at step 824. If one exists, the security level is obtained from that rule at step 826.

If no rule exists for the zone, (or there was no zone data and a default zone is not assumed), step 828 is executed to apply the general default rule (default security level) to the file. In this manner, each program has a security level according to a rule that identifies or matches a program with a certain level quality of match. The highest quality match is the most specific match and takes precedence over the other rules. In the case where there are two or more matches of the same quality, the more restrictive rule takes precedence. Thus, in the exemplary implementation described herein, a hash rule is the highest quality match since there is no ambiguity when it matches a program, regardless of whether the path or filename changes. Matches based on software publisher are next, followed by a path rule that specifies the fully qualified path. Then, other matching path rules are considered such that c:\dir1 and c:\dir1\dir2 both match the program c:\dir1\dir2\calc.exe, but c:\dir1\dir2 provides a higher quality match. The source of the file, e.g., defined via URL zones is considered after these other, since zones are a very broad way of identifying software.

Note that while FIG. 8 provided for the precedence by searching for applicable rules in order, it may be more efficient to search the policy less often (or once) with multiple applicable rules returned, and then evaluate those various rules to determine which one best matches. In any event, consider the following set of rules that may apply to the same file:

A. % WINDIR %\System32\calc.exe: Disallowed
B. Hash of calc.exe (29BAC78BB5F8AA8C5C-815F992928CFC6): Allowed
C. % WINDIR %: Unrestricted
D. c:\winnt: Disallowed As described above, when a user tries to run c:\winnt\system32\calc.exe, rules A and B are exact matches and are considered higher quality matches than the two path rules, C and D. As also described above, the hash rule takes precedence, and thus program is allowed to run. However, if the hash rule did not exist, the program would not be allowed to run, because there is a rule for the fully qualified path name, and its security level disallows execution. Thus, from more specific to less specific of a match, the precedence order for the rules is the hash rule B, the fully qualified path rule A, then rule D and lastly rule C, noting that while rule C and D are equivalent in terms of quality, rule D has a more restrictive security level than does rule C thereby giving it precedence over rule C.

By way of a practical example of precedence, an entity may sign its own-developed controls and use a certificate rule to allow those controls to run but not others. If a problem is later found with a particular control, a hash rule can be used to specify that the particular control cannot run, even though it is properly signed, since the hash rule takes precedence. By way of another practical example of precedence, at present, many viruses have been appearing with the ".vbs" extension, most probably because such programs are relatively easy to write. An entity can set a path rule that disallows ".vbs" files from running by default. However, since that entity may want to allow some .vbs files to execute, a certificate or hash rule may be provided to allow certain (e.g., digitally signed) specific .vbs files to run. Since hash and certificate rules are evaluated before path rules, the path rule will prevent only untrusted .vbs files from executing.

Figure 9:
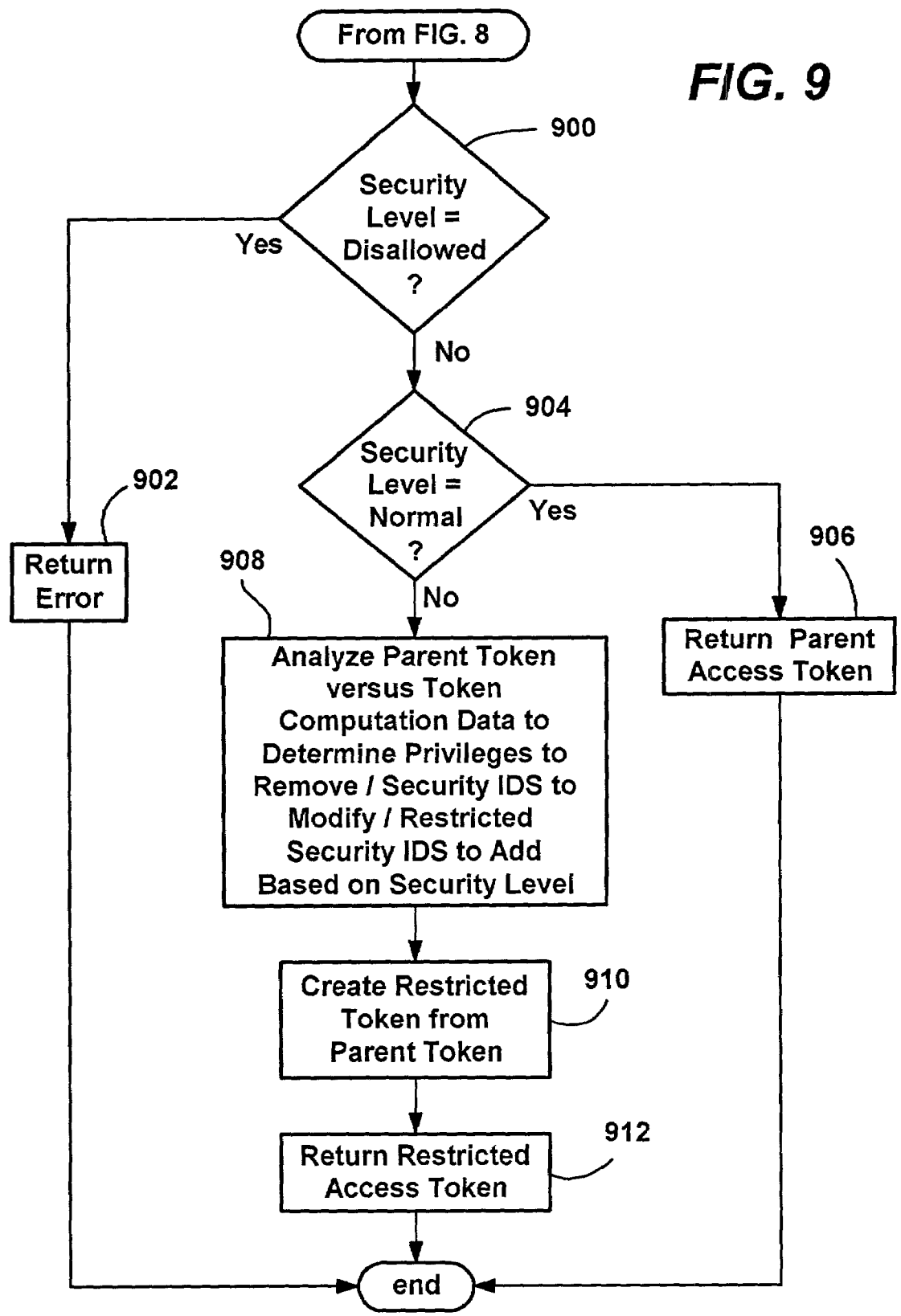
FIG. 9 is a flow diagram representing the general steps taken to restrict a process via a restricted token in accordance with one aspect of the present invention.

FIG. 9 provides an illustration on one way in which the enforcement mechanism 518 (FIG. 5A) enforces security, including restricting software via restricted tokens. In FIG. 9, step 900 tests whether the security level is disallowed (revoked) status. Note that the order of testing the security level is not important. If the security level is disallowed, step 900 branches to step 902 wherein a suitable return (error) code or the like is returned to the calling function, whereby that function denies execution, and also preferably causes the user to be prompted to inform the user of the denial. Note that a preferred system preferably returns information about what transpired, e.g., the rule that was invoked, such as for administrative troubleshooting purposes.

If not disallowed, step 904 tests whether the security level is unrestricted. If so, the enforcement mechanism effectively returns the parent access token (e.g., the token itself, a pointer to it, or permission to use the parent access token), possibly along with a return code having a value indicative of success.

If neither allowed or disallowed, the security level indicates some level of restriction. One or more restriction levels can exist. For example, an "end-user" (arbitrarily named herein) security level may indicate that the administrator security identifier is to be changed to USE_FOR_DENY_ONLY status, certain privileges need to be removed, but the rest of the token left intact. A "constrained" security level can correspond to a need to change the security identifiers to USE_FOR_DENY_ONLY for any known powerful groups, such as Administrators group, the Power Users group, and also to a need to remove most if not all privileges. An "untrusted" security level can correspond to removing all privileges, changing the security identifiers of known powerful groups to USE_FOR_DENY_ONLY, and also changing the security identifiers of any unknown groups to USE_FOR_DENY_ONLY, because those might be powerful. These and other security levels, including ones customized for a given enterprise, may have their token-modification instructions maintained in the token computation data 524 (FIG. 5A) or the like.

Depending on the security level, step 908 of FIG. 9 uses the appropriate token computation data 524 of FIG. 5A, (e.g., a corresponding one of the code authorization levels of FIG. 7 that is in the constructed effective policy 502), along with the parent token's data, to determine which (if any) privileges to remove, which security identifiers (if any) to modify and how to modify them, and which restricted security identifiers to add, if any, along with the type of access for those restricted security identifiers. Step 910 then creates the restricted token, (such as via an API call to the create restricted token API 212 of FIG. 2 made by the enforcement mechanism, with the changes passed as parameters), based on the data in the parent token versus the token computation data for that security level. Step 912 effectively returns the restricted access token to the function that called the enforcement mechanism to complete the call, possibly along with a return code indicating success and/or to use the restricted token. The function may do other things such as create a job object for the process. The restricted token can be used transparently from the user's perspective, however it may be desirable (possibly depending on certain circumstances) to notify the user of what has happened. Note that instead of restricting (or completely denying) access, a dialog box or the like may be provided to allow a user to override the decision, possibly requiring more powerful (e.g., administrator-level) credentials. For example, this would enable skilled personnel to run code that is disallowed without having to contact the administrator that disallowed it. Policy may be used determine whether to enable such a manual override feature for a given machine or user.

As can be seen from the foregoing detailed description, there is provided a framework that controls the execution of software in accordance with a restriction policy, thereby providing security for executable code that substantially reduces or even eliminates many of the problems that result from the execution of unknown code. By automatically and transparently identifying software that possibly includes executable code, and locating a rule corresponding to the identification information, security can be accomplished by controlling the software's ability to execute based on the rule. The present invention provides a flexible, efficient and extensible way to control software execution.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-implemented method, comprising:
   receiving a request to access a software file that includes executable code, the request including a type of access desired by a user for the software file;
   performing a user-credential based access check to determine normal security privileges and access rights of the user for the software file;
   thereafter, performing a file-classification based access check to determine whether the user's normal security privileges and access rights should be modified to include a subset of the user's normal security privileges and access rights for the software file, comprising:
      obtaining a file classification corresponding to the software file for which the access request was received;
      searching a rule set for the received file classification, the rule set providing security rules for a variety of software files which may have executable code, and the security rules being based on file classifications corresponding to the variety of software files; and
      locating a rule in the rule set which matches the received file classification, the rule having a security level associated therewith;
      associating the security level with the software file; and
   controlling execution of the executable code of the software file based on the security level associated with the software file.

2. The method of claim 1 wherein the file classification corresponding to the software file includes a hash value representative of the software file's contents.

3. The method of claim 1 wherein the file classification corresponding to the software file includes a digital signature.

4. The method of claim 3 wherein the rule that corresponds to the file classification applies to any file associated with the digital signature.

5. The method of claim 3 wherein the rule that corresponds to the file classification only applies to a set of at least one selected file associated with the digital signature.

6. The method of claim 3 wherein the rule that corresponds to the file classification applies only to files associated with the digital signatures that have selected file extensions.

7. The method of claim 1 wherein the file classification corresponding to the software file includes path information, and wherein the rule comprises a path rule for the path information.

8. The method of claim 7 wherein the path rule applies only to files having selected file extensions.

9. The method of claim 7 wherein the path is a fully qualified path including a filename.

10. The method of claim 7 wherein the path is a general path that identifies at least one folder.

11. The method of claim 10 wherein at least one folder has a list of selected file extensions associated therewith.

12. The method of claim 7 wherein at least part of the path information corresponds to an environment variable.

13. The method of claim 1 wherein the file classification corresponding to the software file includes data representative of a source of the software file.

14. The method of claim 13 wherein the data representative of the source of the software file comprises a URL zone.

15. The method of claim 1 wherein the file classification corresponding to the software file includes data provided by executable code hosting the software file.

16. The method of claim 1 wherein locating a rule comprises, locating a plurality of applicable rules, and selecting one of the rules of the plurality as the rule that corresponds to the file classification based on selection criteria.

17. The method of claim 16 wherein the selection criteria comprises a precedence ordering.

18. The method of claim 17 wherein the rules that may correspond to the file classification include at least two rules of a set comprising a hash rule, a digital signature rule, an exact path rule, a general path rule and a zone rule, and wherein the precedence ordering comprises any hash rule, then any digital signature rule, then any exact path rule, then any general path rule and then any zone rule.

19. The method of claim 1 further comprising executing the software file in an execution environment that corresponds to the security level.

20. The method of claim 1 wherein controlling execution comprises providing a restricted execution environment for the software file.

21. The method of claim 20 wherein providing a restricted execution environment comprises providing a restricted token, and associating the restricted token with a process of the software file.

22. The method of claim 21 wherein providing the restricted token includes having at least one privilege therein removed relative to a parent token.

23. The method of claim 21 wherein providing the restricted token includes modifying at least one security identifier relative to a parent token such that the restricted token has less access to at least one resource relative to access via a parent token.

24. The method of claim 21 wherein providing the restricted token includes adding at least one restricted security identifier to the restricted token relative to a parent token.

25. The method of claim 20 wherein providing a restricted execution environment comprises providing a job object having limitations associated therewith for executing the software file.

26. The method of claim 20 wherein providing a restricted execution environment comprises restricting network access for the software file.

27. The method of claim 1 wherein controlling execution comprises disallowing the execution.

28. The method of claim 1 further comprising, providing a set of rules including the rule that corresponds to the file classification.

29. The method of claim 28 wherein at least part of the set of rules are provided via a user interface.

30. The method of claim 1, wherein controlling execution includes locating data corresponding to the security level, the data including information on whether to allow execution, and if so, the data further including information on providing an execution environment for executing the software file.

31. The method of claim 30, wherein the data corresponds to settings for untrusted content, and wherein the data specifies that a restricted token is to be derived from a parent token by removing any privileges relative to the parent token and by removing any unknown security identifiers relative to the parent token.

32. The method of claim 1, wherein controlling execution of executable content of the software file based on the security level includes providing a restricted token for association with at least one process of the software file the restricted token derived from a parent token and having reduced access rights or at least one privilege removed relative to the parent token.

33. The method of claim 1 wherein the file classification corresponding to the software file that may be executed is received at a function, and further comprising, placing a call from the function to an enforcement mechanism, the enforcement mechanism locating the rule.

34. The method of claim 1 wherein locating a rule comprises accessing policy information.

35. The method of claim 34 wherein the policy information may be updated dynamically.

36. The method of claim 34 wherein the policy information is maintained in a group policy object.

37. The method of claim 34 wherein the policy information is maintained in a local registry.

38. The method of claim 34 wherein the policy information is maintained in an effective policy constructed from a group policy object for a machine, a group policy object for a user, local machine data and a local user data.

39. The method of claim 1 wherein the software file is maintained within a folder, wherein the rule applies to the folder and further indicates that each file therein runs unrestricted, and wherein the folder is protected from write access with respect to a user executing the software file.

40. Computer storage media having computer-executable instructions stored thereon that when executed by a computing system perform a method comprising:
receiving, a request to access a software file that includes executable code the request including a type of access desired by a user for the software file:
performing a user-credential based access check to determine normal security privileges and access rights of the user for the software file:
thereafter, performing a file-classification based access check to determine whether the user's normal security privileges and access rights should be modified to include a subset of the user's normal security privileges and access rights for the software file, comprising:
obtaining a file classification corresponding to the software file for which the access request was received;
searching a rule set for the received file classification, the rule set providing security rules for a variety of software files which may have executable code, and the security rules being based on file classifications corresponding to the variety of software files; and
locating a rule in the rule set which matches the received file classification, the rule having a security level associated therewith;
associating the security level with the software file; and
controlling execution of the executable code of the software file based on the security level associated with the software file.

41. A computer-implemented method, comprising:
providing a plurality of rules for executable software files, each rule having a security level associated therewith;
receiving a request to access a particular software file that include code;
performing a user-credential based access check to determine normal security privileges and access rights of the user for the particular software file;
thereafter, performing a file-classification based access check to determine whether the user's normal security privileges and access rights should be modified to include a subset of the user's normal security privileges and access rights for the particular software file, comprising:
searching a rule set for an applicable rule to apply to the software file, the rule set providing security rules for a variety of software files which may have executable code, and the security rules being based on file classifications corresponding to the variety of software files;
determining which rule applies to the particular software file based on a file classification of that software file, and;
associating the particular software file with execution information corresponding to the security level to control the software file's runtime capabilities.

42. The method of claim 41 wherein providing a plurality of rules for executable software files includes providing a policy object.

43. The method of claim 41 wherein determining which rule applies to the particular software file includes, determining whether a hash rule is maintained for the software file.

44. The method of claim 41 wherein determining which rule applies to the particular software file includes, determining whether the software file has a digital signature associated therewith, and if so, determining whether a digital signature rule exists for that digital signature.

45. The method of claim 41 wherein determining which rule applies to the particular software file includes, determining whether a path rule is maintained for the software file.

46. The method of claim 41 wherein determining which rule applies to the particular software file includes, determining whether a zone rule applies to the software file.

47. The method of claim 41 wherein determining which rule applies to the particular software file includes selecting one of a plurality of applicable rules based on a precedence order.

48. The method of claim 41 wherein determining which rule applies to the particular software file includes selecting one of a plurality of applicable rules based on a precedence order.

49. The method of claim 41 wherein associating the particular software file with the execution information corresponding to the security level comprises computing a restricted token based on the security level.

50. The method of claim 41 wherein associating the particular software file with the execution information corresponding to the security level comprises determining network restrictions based on the security level.

51. The method of claim 41 wherein associating the particular software file with the execution information corresponding to the security level comprises determining job object limitations based on the security level.

52. The method of claim 41 further comprising, executing the particular software file in an execution environment that is based on the security level.

53. Computer storage media having computer-executable instructions stored thereon that when executed by a computing system, perform a method comprising:
provide a plurality of rules for executable software files, each rule having a security level associated therewith;
receiving a request to access a particular software file that includes executable code:
performing a user-credential based access check to determine normal security privileges and access rights of the user for the software file:
thereafter, performing a file-classification based access check to determine whether the user's normal security privileges and access rights should be modified to include a subset of the user's normal security privileges and access rights for the software file, comprising:
searching a rule set for an applicable rule to apply to the software file, the rule set providing security rules for a variety of software files which may have executable code, and the security rules being based on file classifications corresponding to the variety of software files; and
determining which rule applies to the particular software file based on a file classification of that software file; and
associating the particular software file with execution information corresponding to the security level to control the software file's runtime capabilities.

54. A computer system having a processor that executes a security mechanism, the computer system comprising:
means for implementing a set of at least one function, each function of the set being configured to receive a request relating to executing a software file, the software file being associated with software classification information, the software classification information being indicative of at least some executable code within the software file;
means for establishing a policy container having a plurality of rules therein, the plurality of rules applying to a variety of software files which may have executable code and being based on a file classification corresponding to the variety of software files, each rule being associated with a security level; and
means for implementing an enforcement mechanism configured for communication with each function of the set of functions, the implemented enforcement mechanism being further configured to:
perform a user-credential based access check to determine normal security privileges and access rights of the user for the software file;
obtain software classification information associated with the software file from a function of the set,
after performing the user-credential based access check, consult the policy container to locate a rule based on the software classification, and
associate security information with the software file, the security information based on the security level associated with the rule.

55. The system of claim 54 wherein the security information associated with the software file comprises a normal access token of a user.

56. The system of claim 54 wherein the security information associated with the software file comprises return data indicative of disallowing execution.

57. The system of claim 54 wherein the security information associated with the software file comprises a restricted token.

58. The system of claim 57 wherein the enforcement mechanism computes the restricted token from a parent token.

59. The system of claim 58 wherein the restricted token has less access to at least one resource relative to the parent token.

60. The system of claim 58 wherein the restricted token has at least one less privilege relative to the parent token.

61. The system of claim 58 wherein the restricted token includes at least one restricted security identifier that is not present in the parent token.

62. The system of claim 54 wherein the security information associated with the software file comprises a job object.

63. The system of claim 54 wherein the security information associated with the software file comprises network access restrictions.

64. The system of claim 54 wherein, one of the functions of the set is configured to load the software file into memory.

65. The system of claim 54 wherein one of the functions of the set is configured to create a process.

66. The system of claim 54 wherein one of the functions of the set is configured to execute the software file.

67. The system of claim 54 wherein one of the functions of the set is configured to create an object.

68. The system of claim 54 wherein one of the functions of the set is configured to run a script.

69. The system of claim 54 wherein one of the functions of the set is configured to install software onto the system.

70. The system of claim 54 wherein one of the rules comprises a hash rule.

71. The system of claim 54 wherein one of the rules comprises a digital signature rule.

72. The system of claim 54 wherein one of the rules comprises a path rule.

73. The system of claim 54 wherein one of the rules comprises a zone rule.

74. The system of claim 54 wherein the policy container includes information from at least one group policy object.

* * * * *

UNITED STATES PATENT AND TRADEMARK OFFICE
CERTIFICATE OF CORRECTION

| | | |
|---|---|---|
| PATENT NO. | : 7,350,204 B2 | |
| APPLICATION NO. | : 09/877710 | |
| DATED | : March 25, 2008 | |
| INVENTOR(S) | : John J. Lambert et al. | |

It is certified that error appears in the above-identified patent and that said Letters Patent is hereby corrected as shown below:

In column 25, line 44, in Claim 40, after "code" insert -- , --.

In column 26, line 5, in Claim 41, delete "include" and insert -- includes executable --, therefor.

In column 26, line 24, in Claim 41, delete "file, and;" and insert -- file and; --, therefor.

In column 28, line 32, in Claim 64, delete "wherein," and insert -- wherein --, therefor.

Signed and Sealed this
Twenty-second Day of February, 2011

David J. Kappos
*Director of the United States Patent and Trademark Office*